Nov. 26, 1946.  D. S. GRUBBS  2,411,621
ALIGNING BAR
Filed June 28, 1945
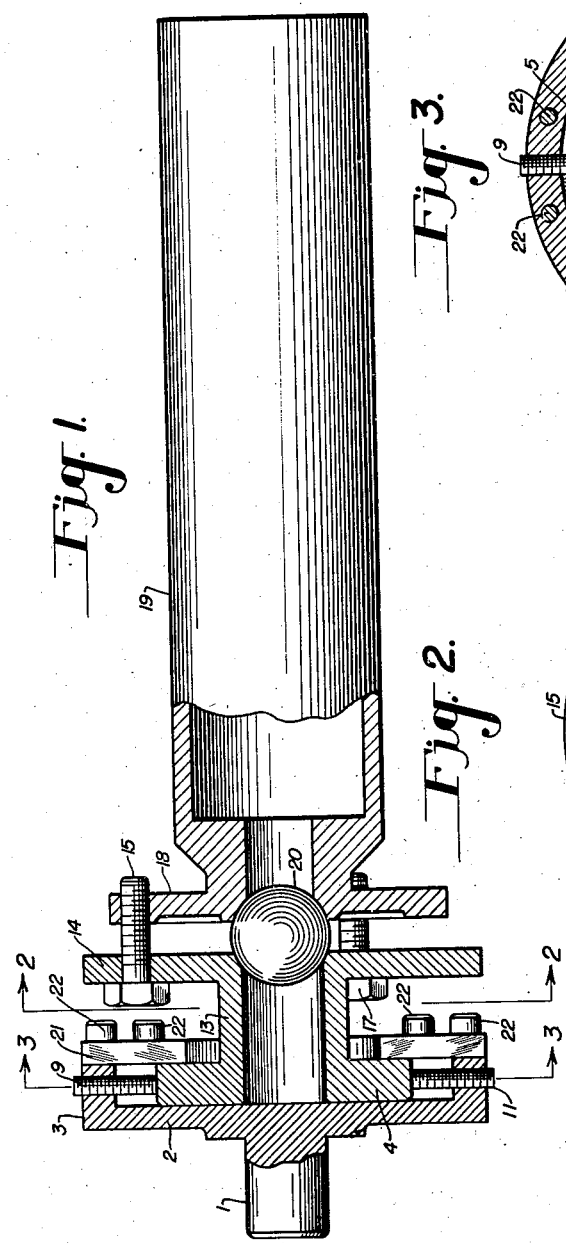
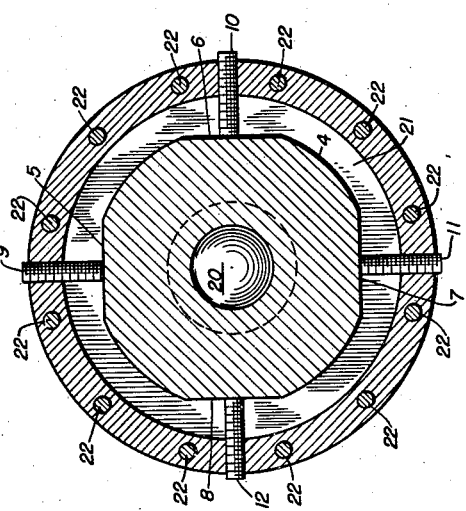
INVENTOR.
DAVID S. GRUBBS
BY
Frank H. Harmon
ATTORNEY Patented Nov. 26, 1946

2,411,621

UNITED STATES PATENT OFFICE 2,411,621

ALIGNING BAR

David S. Grubbs, Cleveland, Ohio, assignor, by mesne assignments, to Jack & Heintz Precision Industries, Inc., Cleveland, Ohio, a corporation of Delaware Application June 28, 1945, Serial No. 602,107

4 Claims. (Cl. 82—45)

This invention relates in general to aligning bars for use in aligning the tool carriage with the work holder of an automatic metal working machine and has for one of its primary objects to provide an aligning bar with means whereby its spindle may be universally adjusted with respect to the work holder.

With the foregoing and other objects in view the invention resides in the combination of parts and in the details of construction hereinafter set forth in the following specification and appended claims, certain embodiments thereof being illustrated in the accompanying drawing, in which:

Figure 1 is a view partly in side elevation and partly in longitudinal section of the aligning device assembly including a part to be engaged by a work holding chuck, a member radially adjustable therein and a spindle universally adjustable with respect to this member about a ball and socket joint;

Figure 2 is a view in section taken along line 2—2 of Figure 1; and

Figure 3 is a view in section taken along line 3—3 of Figure 1.

Referring more particularly to the drawing, the shank 1 of a holder plate 2 is adapted to be held in the chuck of a work holding device. The plate has a circular flange 3 to loosely receive a plate 4 of appreciably lesser outside diameter than the inner diameter of flange 3. Plate 4 has four flat sides 5, 6, 7 and 8 and flange 3 has extending therethrough four screw bolts 9, 10, 11 and 12 in screw-threaded engagement with the flange. These bolts abut the four flat sides and adjustment of the four bolts effects a radial adjustment of plate 4 with respect to flange 3 and consequently with respect to shank 1 and the center line of the work holding chuck.

Integral with plate 4 is a hollow shank 13 on whose other end is an integral plate 14 which has three holes to receive three screw bolts 15, 16 and 17 to which screw-threadedly engage the circular flange 18 of an elongated hollow spindle 19 for purposes of adjustment of the relationship between the spindle and plate 14 and consequently with respect to shank 1 and the work-holding chuck. The adjacent hollow surfaces of the shank 13 and spindle 19 are provided with opposed spherical seats to receive a ball 20 which maintains flanges 14 and 18 appreciably spaced apart. Thus an adjustment of nuts 15, 16 and 17 provides a means for universal adjustment of spindle 19 about the ball with respect to flange 14 and consequently with respect to shank 1 and the work holding chuck. In order to retain plate 4 against axial movement there is provided a two piece centrally apertured plate 21 which is adjustably secured to flange 3 by a series of Allen head screws 22 passing through plate 21 and into screw-threaded engagement with flange 3 to retain plate 4 between plate 21 and holder plate 2.

In machining operations it is essential to center the rotating work holding chuck with respect to the tool carrying carriage that is linearly movable to bring the machine tool into and out of engagement with the work. The purpose of the device whose construction has been described is to center the spindle 19 with respect to the work-holding chuck. Conventional means may be employed to determine whether the spindle, when rotatably driven by the assembly of Figure 1 which is rotated by the rotating work-holding chuck, is describing a true circle about its own axis and equal in diameter to that of the spindle.

The adjustment nuts 9, 10, 11 and 12 in their end abutment with the four flat sides 5, 6, 7 and 8 of flange 4 affords a means of radial adjustment of flanges 4, 14 and 18 and spindle 19 with respect to the holder plate 2, its shank 1 and the rotatable work holding chuck. The adjustment nuts 15, 16 and 17 and ball 20 interposed between flange 14 and spindle flange 18 affords a means of universal adjustment of the spindle with respect to shank 1 and the work-holding chuck in addition to the radial adjustment provided for by bolts 9, 10, 11 and 12. These two types of adjustment may be made in any sequence until the proper and accurate alignment of the spindle has been accomplished so that in its rotation it will describe a true circle about its own axis and equal in diameter to that of the spindle.

The subsequent alignment of the tool carrying carriage with respect to the spindle assures the proper alignment of the tool with the work to a high degree of precision. The unique and novel feature of the aligning assembly, its simplicity and compactness of design to form a self-contained unit which provides a radial as well as a universal adjustment of the spindle with respect to the work-holding chuck for aligning purposes.

I claim:

1. An aligning bar assembly for aligning the tool carriage with the rotatable work-holding chuck of a metal working machine, said assembly including a shank to be engaged and driven by said chuck, a flange rigid with said shank for receiving in loose flatwise engagement a smaller flange and means for releasably securing said flanges together and for adjusting the same radially with respect to each other, a third flange rigid with said smaller flange, an elongated hollow spindle having an end flange and means for releasably securing said third flange and said spindle flange and for adjusting the same universally with respect to each other.

2. An aligning bar assembly for aligning the tool carriage with the rotatable work-holding chuck of a metal working machine, said assembly including a shank to be engaged and driven by said chuck, said shank having a flange, a second flange releasably secured thereto and radially adjustable with respect thereto, a third flange rigid with said second flange, an elongated hollow spindle having an end flange, a ball interposed between the spindle flange and said third flange and of such size as to space the same apart and means for releasably connecting the same together and for adjusting the spindle flange universally with respect to said third flange.

3. An aligning bar assembly for aligning the tool carriage with the rotatable work-holding chuck of a metal working machine, said assembly including a shank to be engaged and driven by said chuck, a flange rigid with said shank for receiving in loose flatwise engagement a smaller flange the latter having a plurality of flat edge portions to be engaged by end abutment by screw bolts extending radially inwardly through said shank flange for adjustment of said smaller flange radially with respect thereto, an elongated hollow spindle having an end flange, a ball interposed between the spindle flange and said third flange and of such size as to space the same apart and means for releasably connecting the same together and for adjusting the spindle flange universally with respect to said third flange.

4. An aligning bar assembly for aligning the tool carriage with the rotatable work-holding chuck of a metal working machine, said assembly including a shank to be engaged and driven by said chuck, said shank having a flange, a second flange releasably secured thereto and radially adjustable with respect thereto, a third flange rigid with said second flange, a hollow stem rigid with said second and third flanges and extending therebetween, an elongated hollow spindle having an end flange and adjustment bolts passing therethrough and through said third flange, the adjacent inner ends of said hollow stem and spindle having opposed spherical seats to receive a ball of such size as to space the adjacent end flanges of said hollow stem and spindle apart whereby the adjustment bolts passing through said last named flanges affords a means of universal adjustment of said spindle with said hollow stem.

DAVID S. GRUBBS.